Feb. 23, 1937.   C. F. RAUEN   2,072,057
TRANSMISSION
Original Filed May 29, 1923   3 Sheets-Sheet 1
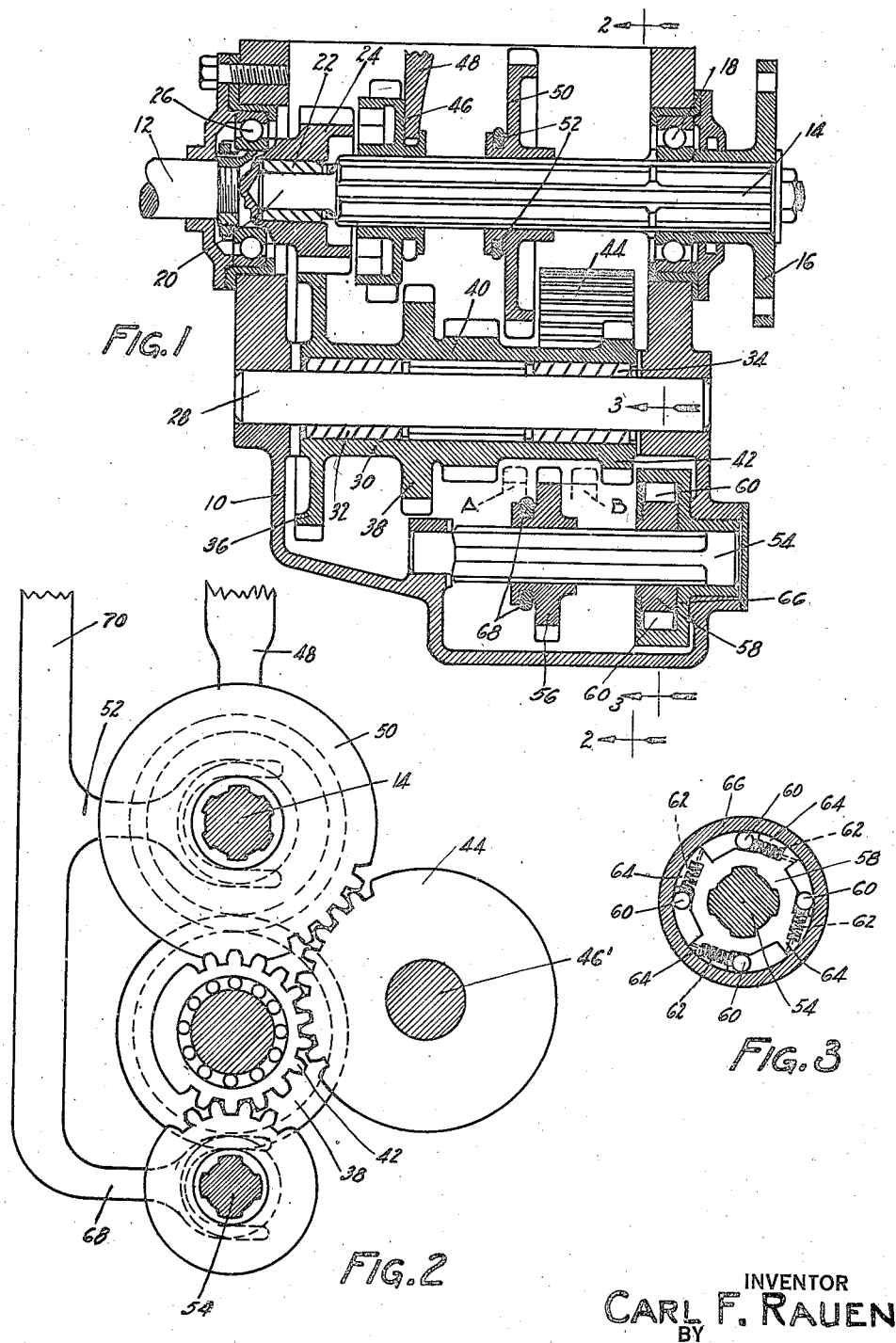
INVENTOR
CARL F. RAUEN
BY
M. W. McConkey
ATTORNEY

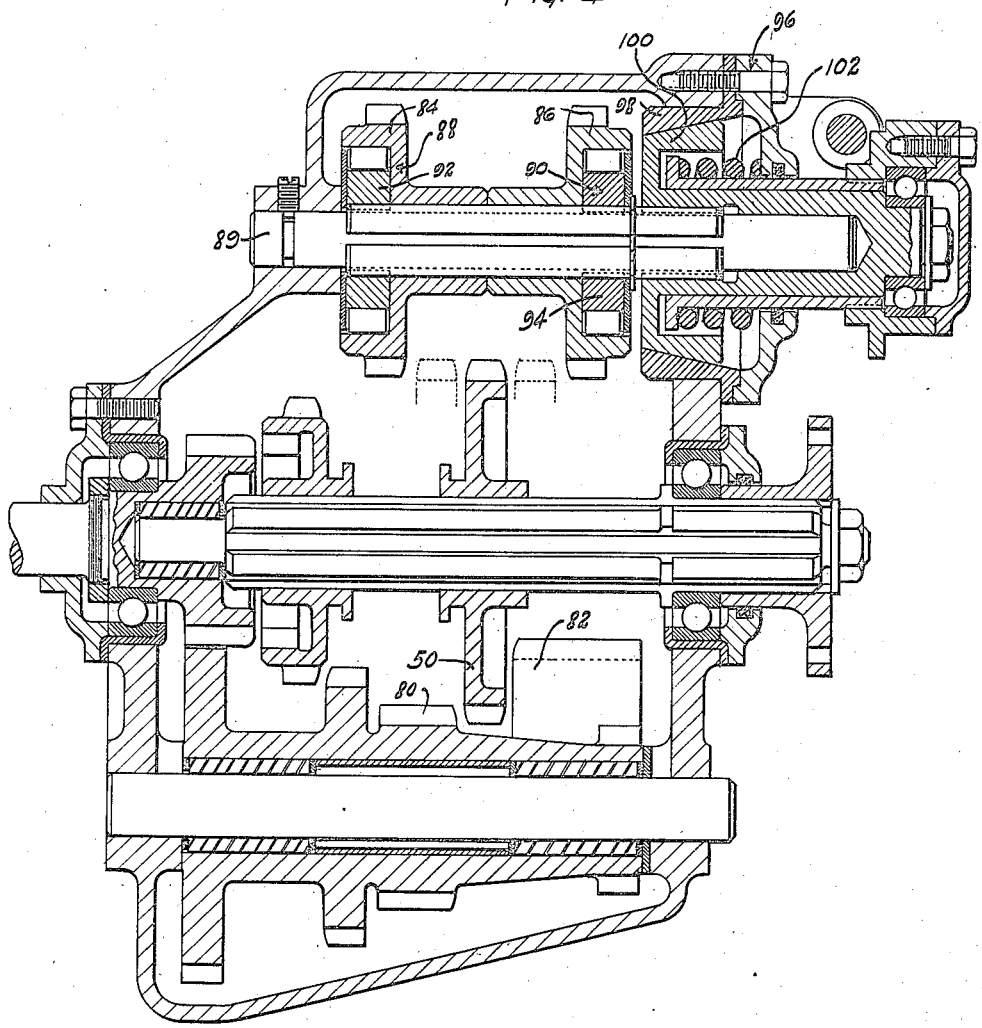

Feb. 23, 1937.                C. F. RAUEN                2,072,057
                              TRANSMISSION
                   Original Filed May 29, 1923    3 Sheets-Sheet 3

Patented Feb. 23, 1937

2,072,057

UNITED STATES PATENT OFFICE 2,072,057

TRANSMISSION

Carl F. Rauen, Grosse Pointe, Mich.

Original application May 29, 1923, Serial No. 642,301. Divided and this application May 9, 1927, Serial No. 190,092

51 Claims. (Cl. 192—4)

This invention relates to transmissions, and is illustrated as embodied in a selective sliding gear automobile transmission, the present invention being a divisional application of my copending application Serial No. 642,301, filed May 29, 1923. An object of the invention is to provide simple and effective means for preventing movement of the automobile or other device in which the transmission is used in the opposite direction from that desired. In one desirable arrangement there is a one-way clutch device or equivalent means for preventing the undesired movement. This is operated by a device illustrated as a sliding gear which is controlled by the speed-changing means so that it may be rendered operative at the proper time, for example when the gear is in low gear or in reverse. Preferably this safety device is controlled by the gear-shifting means, and I consider it desirable that it be normally inoperative and that it be rendered operative by movement of the speed-changing means beyond its normal position.

In the embodiment illustrated in the accompanying drawings, the safety device includes a shaft in the transmission having a one-way clutch device preventing its rotation in one direction, and on which is splined a gear arranged to be shifted with the gear which provides low speed and reverse. The gear for the safety device is shown as brought into mesh by further movement of the gear shift lever beyond the movement necessary for throwing in low or reverse gear.

The above and other objects and features of the invention, including various novel combinations of parts and desirable particular constructions, will be apparent from the following description of the illustrative embodiment shown in the accompanying drawings, in which:

Figure 1 is a vertical section through the transmission, that is, through the driving and driven shafts and through the countershaft;

Figure 2 is a diagrammatic vertical section on the line 2—2 of Figure 1 and showing the relation of the parts to the reverse idler gear;

Figure 3 is a section on the line 3—3 of Figure 1, showing the one-way clutch device;

Figure 4 is a view of a further modification of my invention wherein a sliding gear on the driven shaft is engageable with both a right and a left hand roller clutch;

Figure 5:
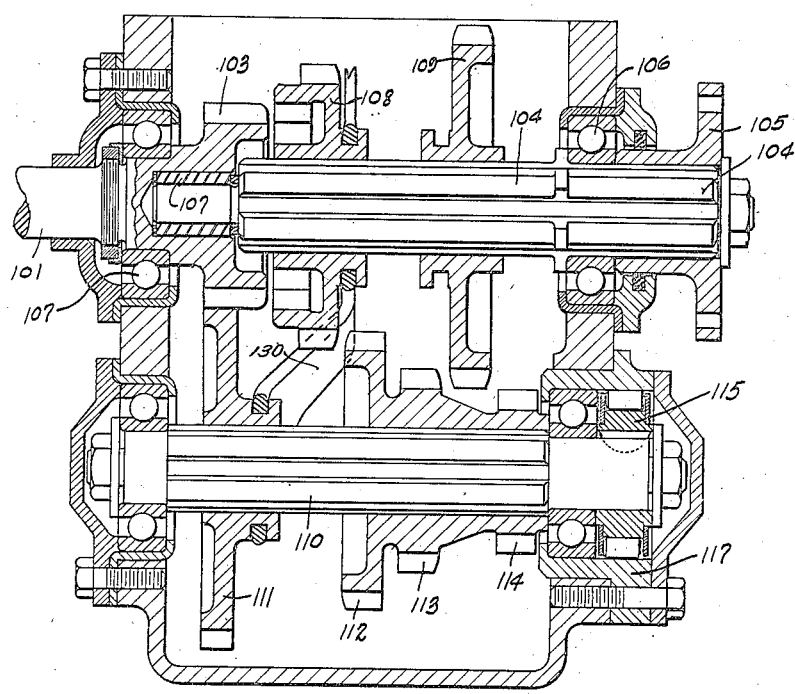
Figure 5 is a vertical section through a transmission gear box of an automobile, showing another adaptation of my invention.

While the invention is capable of embodiment in any desired type of speed-changing or reversing mechanism, I have shown it in the drawings as embodied in an ordinary selective automobile transmission of the sliding gear type, including a casing 10, a driving shaft 12 from the clutch (not shown), and a splined driving shaft 14 having a driving flange 16 to be connected to the usual universal joint for the propeller shaft. The driven shaft 14 is supported by an anti-friction bearing 18 at its rear end and at its front end is provided with a reduced portion 20 supported in a roller bearing 22 in a small gear 24 which is integral with or secured to the rear end of the driving shaft 12. The shaft 12 is supported in a suitable anti-friction bearing 26. Below the shafts 12 and 14 is arranged a countershaft 28 which is shown as secured in the casing 10 in such a manner that it does not rotate,— that is, the shaft 28 may be pinned or keyed in any usual or desired manner to the casing 10 so that it is stationary.

The countershaft 28 is provided with a gear unit 30 mounted on roller bearings 32 and 34 and including a gear 36 which is constantly in mesh with the gear 24 on the driving shaft 12, so that the gear unit 30 is driven as long as shaft 12 is rotating. The unit 30 also includes a second speed gear 38, a relatively wide low speed gear 40, and a reverse gear 42 which is constantly in mesh with a relatively wide reverse idler gear 44 mounted on a shaft 46' at one side of the countershaft 28. Splined on the driving shaft 14 there is a high and intermediate speed gear 46 controlled from the gear shift lever by a shifter fork 48, and which when moved to the left in Figure 1 connects the shaft 14 to the shaft 12 for direct high-speed drive in the usual manner by meshing with the teeth of gear 24, while it is also provided with external teeth to mesh with the intermediate speed gear 38 and be driven thereby when moved to the right by the shifter fork 48. There is also splined on the shaft 14 a second gear 50 which can be moved by a shifter fork 52 to the left into mesh with the low speed gear 40 or to the right into mesh with the reverse idler gear 44, thus driving the shaft 14 at relatively low speeds either in a forward or a reverse direction.

According to an important feature of the present invention, an auxiliary countershaft 54 is rotatably mounted in the casing 10 below the shaft 28 and is splined to receive a gear 56 and a part 58 of a one-way roller clutch or an equivalent device which permits rotation of the shaft only in one direction. The roller clutch embodies the usual rollers, locking or wedging elements or devices 60 urged by springs 62 arranged in recesses in fingers 64 of the member 58 in a direction to wedge them between inclined surfaces on the member 58 and an internal cylindrical surface on a stationary outer member 66 secured to the casing 10 and illustrated as serving as a bearing for the right-hand end of the shaft 54. In Figure 3 the springs 62 urge the rollers 60 in such a direction that they wedge themselves in place to prevent rotation of the shaft 54 in a clockwise direction. The shaft 54 is, however, free to rotate in a counter-clockwise direction, since in this direction the action of the members 58 and 66 on the rollers 60 is to move them inwardly against the resistance of the springs 62 into idle positions.

The gear 56 or its equivalent is shown as controlled by part of the speed-changing means, in this particular arrangement there being a shifter fork 68 integral with or secured to a shifter member 70 which also carries or is integrally formed with the shifter fork 52 for the gear 50. The shifter members 48 and 70 are operated by the usual universally-supported gear-shift lever in almost universal use for automobile transmissions, and which is so well known that extended description is unnecessary.

The ordinary movement of the gear-shift lever to bring the gear 50 into engagement with the gear 40 to drive the car at low speed is preferably only sufficient to move the gear 56 to dotted line position "A" in Figure 1, so that the safety device 60 is still inoperative. Similarly the movement of the gear 50 to the right into mesh with the reverse idler gear 44 will normally only move the gear 56 to dotted line position "B" in Figure 1, with the safety device 60 still inoperative. Further movement of the gear shift lever in either direction, however, will cause the gear 56 to mesh either with the gear 40 or the gear 42 to render the safety device 60 operative to prevent, through the gears 56 and 50, any rotation of the shaft 14 in a direction opposite to that desired by the driver. It will be seen that gears 40 and 44 are wide enough so that they remain in mesh with gear 50 when the gear 56 is brought into active position in either direction. Thus the driver can at will leave the safety device in inoperative position and operate the transmission the same as any other selective transmission, or when in low gear or in reverse he can, if he wishes, render the safety device operative to prevent movement of the car in the wrong direction. This is useful, for example, when there is a considerable grade at a cross-street, and it is not desired to hold the car with the brake while waiting for the direction of the traffic to change. It also facilitates starting from such a position when the traffic does change, since the driver's foot may remain on the accelerator and his hands on the steering wheel, on account of the fact that it is not necessary to operate either the foot or hand brakes.

In the device illustrated in Fig. 4, the sliding gear 50 of the transmission mechanism, which is selectively engageable with the gear 80 of the countershaft cluster for providing a low speed drive and with the idler gear 82 for providing a reverse drive, is also adapted to be overshifted in either direction to engage, respectively, with gears 84 and 86 mounted upon a shaft 89, the gears 84 and 86 forming the outer members of two one-way roller clutches 88 and 90, the inner members 92 and 94 of which are splined to the shaft 89.

The one-way roller clutches 88 and 90 are arranged reversely to each other so that when the gear 50 is engaged with either the gear 84 or the gear 86, the driven shaft upon which the gear 50 is slidable may rotate in a direction corresponding to the direction for which the gears are set, and when the vehicle tends to move in the direction opposite to that in which the gears are set, whether forwardly or reversely, the clutches will operate to hold the vehicle against movement in such direction. The shaft 89 is held against movement by a manually releasable clutch 96 which comprises a friction member 98 fixed to the gear box, a friction member 100 slidably splined to the shaft 89, and a spring 102 operable for holding the friction members in operative relationship. The clutch 96 is adapted to be released by separating the friction members 98 and 100 against the force of the spring 102. The gears 84 and 86 can be selectively engaged by the gear 50 upon overshifting the same in either direction, and low and reverse gear speeds may be obtained with or without the automatic brake becoming effective.

Figure 6:
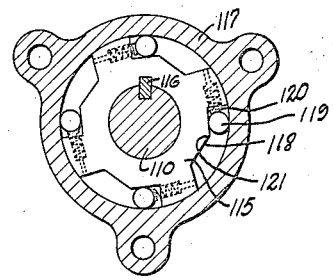
Figure 6 is a section taken in a plane on the line 6—6 of Figure 5.

Referring to Figs. 5 and 6, there is illustrated a gear box of a multiple speed gear transmission for an automobile, in which an engine driven shaft 101 is integral with the main gear 103, a suitable clutch (not shown) being provided between the shaft 101 and the engine, in the customary manner. A driven shaft 104 is connected through suitable splines to a flanged member 105 to which is connected the propeller shaft (not shown) and universal joint (not shown) of the automobile transmission mechanism. This shaft 104 is mounted in suitable ball bearings 106 at one end in the transmission box and is mounted at its opposite end by means of a roller bearing 107 in the main gear 103. Splined upon the shaft 104 is a gear 108 adapted to mesh with the drive gear 103 when moved to the left, in order to directly couple the shaft 101 to the shaft 104 for high speed drive.

The gear 108 may be moved to the right in order to be disengaged from the gear 103 and to engage with the second speed gear 112 on the countershaft 110. A gear 109 is splined upon the shaft 104 and adapted to move to the left or the right to mesh with a gear 113 on the countershaft for low speed or to a gear (not shown) on the idler shaft for reverse speed.

The countershaft 110 is mounted in suitable ball bearings in the ends of the gear box. Splined upon this shaft 110 is a countershaft gear 111 which is movable with the gear 108 by a common shift fork 130 so as to be disengaged from the gear 103 when gears 108 and 103 are coupled together for direct drive, and to be engaged with the gear 103 when the gear 108 is in the position shown, or moved to the right so that the countershaft will be rotated when the shafts 101 and 104 are not directly coupled together. Splined upon the countershaft 110 are the gears 112, 113 and 114; gear 112 being adapted to be engaged with the gear 108 for the second speed, gear 113 engaging with gear 109 for the first or low speed, and gear 114 engaging with an idler gear (not shown) mounted upon an idling shaft, the idler gear engaging with the gear 109 for reverse speed.

Upon the countershaft 110 is mounted a part 115 by means of a key 116, and this part 115 is adapted to freely rotate in one direction within an outer fixed member 117 suitably bolted to the gear box in a stationary position. The part 115 is provided with cutaway portions 118, within each of which is a roller 119 adapted to be pressed by a spring 120 so as to be urged by this spring away from its position in the end of the cutaway portion 118, as shown in Fig. 6. The cutaway portions 118 are suitably tapered, the distance between the point 121 of each cutaway portion and the fixed outer part 117 being smaller than the diameter of the roller 119. It will be seen, therefore, that the springs 120 in the roller 119 will prevent a counter-clockwise movement of the countershaft 110, as illustrated in Fig. 6, as they will wedge between the parts 115 and 117, but will freely permit a clockwise rotation of the shaft, as there is then no wedging action to lock the parts 115 and 117 together.

The automatic brake device will at any time prevent reverse rotation of the countershaft 110, and if the countershaft 110 is geared by means of either of the gears 108 and 109 so that the transmission is in second, first or reverse speed, will prevent the car from moving in a direction opposite to which it is intended. As the countershaft can be driven in only one direction, no throw-out or release of the brake is required when it is desired to go backward. This brake will not prevent reverse movement of the car when in high gear, since under such circumstances the countershaft 110 is not driven.

While several illustrative embodiments have been described in detail, it is not my intention to limit the scope of the invention to any particular embodiment or otherwise than by the terms of the appended claims.

I claim:

1. In a motor vehicle transmission mechanism including a driven shaft and having shift means whereby it may be set for a forward or reverse drive, a device for preventing reverse movement of the driven shaft when the mechanism is set for a forward drive, and for preventing forward movement of said shaft when the mechanism is set for a reverse drive, and means for controlling the device from said shift means.

2. In a motor vehicle transmission mechanism including a driven shaft and having shift means whereby it may be set for a forward or reverse drive, a device comprising a cylindrical member and a member carrying at least one locking element for preventing rotary motion of the driven shaft in one direction whilst permitting motion in the other direction, and a control device operated from the said shift means to control the operation of said device to prevent rotation of the said shaft in the direction opposite to that for which the transmission is set by the shift means.

3. In a motor vehicle transmission mechanism, means for preventing movement of the vehicle in a direction opposite to that for which the transmission is set, comprising fixed and rotary members, and means operated from the usual sliding gear for the reverse and low speed forward drives cooperating with the said fixed and rotary members so as to permit movement of the vehicle only in the desired direction.

4. In a motor vehicle transmission mechanism, means for preventing movement of the vehicle in a direction opposite to the desired direction of travel, comprising fixed and rotary elements, locking means cooperating with both such elements, and a control device movable with the usual sliding gear for the reverse and low speed forward drives and cooperating with the said locking means to either permit a forward and prevent a reverse movement or to permit a reverse and prevent a forward movement.

5. A vehicle transmission comprising, in combination, change speed gears, at least one of which is slidable in changing speed, a one-way clutch device, and a gear for operating said device which is moved into mesh with one of said gears in unison with the movement of said slidable gear.

6. A vehicle transmission comprising, in combination, change speed gears, at least one of which is slidable in changing speed, a one-way clutch device, and a gear for operating said device which is moved into mesh with one of said gears in unison with the movement of said slidable gear, there being an intermediate position in which the slidable gear is in mesh and the gear for the clutch device is not in mesh.

7. A motor vehicle transmission comprising, in combination, a shaft, means for driving said shaft selectively at different speeds and in opposite directions, driver-operated means for controlling said driving means, and means for preventing rotation of said shaft in one direction and which is connected to said driver-operated means in such a manner as to be rendered operative or inoperative at the will of the driver.

8. A motor vehicle transmission comprising, in combination, a shaft, means for driving said shaft selectively at different speeds and in opposite directions, driver-operated means for controlling said driving means, and means acting on a part of said driving means for preventing rotation of said shaft in one direction and which is operatively controlled by said driver-operated means.

9. A motor vehicle transmission comprising, in combination, a shaft, devices operable selectively for driving the shaft at different speeds, and a normally inoperative device arranged to be operable when one of said devices is in operation and which prevents rotation of the shaft in one direction.

10. A motor vehicle transmission comprising, in combination, a shaft, devices operable selectively for driving the shaft in opposite directions, and a normally inoperative device arranged to be operable when one of said devices is in operation and which prevents rotation of the shaft in one direction.

11. A motor vehicle transmission comprising, in combination, a driven member, selectively operable change speed devices for driving said member, a member movable to operate at least one of said devices, and means rendered operative by further movement of said movable member to prevent movement of the driven member in one direction.

12. A motor vehicle transmission comprising, in combination, a driven member, selectively operable devices for driving said member in opposite directions, a member movable to control at least one of said devices, and means rendered operative by further movement of said movable member to prevent movement of the driven member in one direction.

13. The combination with a vehicle transmission, of an auxiliary shaft therefor rotatable in one direction, a rotatable gear member slidably mounted on said auxiliary shaft, and means cooperating with the shaft and said member for preventing rotation of said member in one direction.

14. The combination with a vehicle transmission, of an auxiliary shaft therefor rotatable in one direction, a rotatable gear member slidably mounted on said auxiliary shaft, and a one-way clutch device cooperating with said shaft and said member for preventing rotation of said member in one direction.

15. A motor vehicle transmission comprising in combination a driven shaft, change speed gear means for engaging said shaft whereby to rotate the same, means controlled by said first mentioned means whereby said driven shaft is prevented from rotating in predetermined directions, and a manually operated device controlling both of said means.

16. The combination with a vehicle change speed transmission provided with a uni-directional driving shaft and a manually operated shifting member, of means optionally cooperable with said shifting member for preventing reverse rotation of said shaft.

17. A vehicle transmission comprising a drive shaft, a countershaft, a driven shaft, change speed gearing comprising a reverse idler gear operatively connecting said countershaft and said driven shaft to drive said driven shaft in a reverse direction, and a one-way clutch device cooperating with said reverse idler gear to prevent at will the reverse movement of said reverse idler.

18. The combination with an automobile transmission having a gear shift lever which is movable from a neutral position to a plurality of other positions so as to place said transmission in gear, of a normally inoperative reverse brake and applying means for said brake operable by said lever by moving said lever from its neutral position through and to a point beyond one of its other positions.

19. In an automobile, a transmission shaft, braking means thereon for arresting backward movement of the car while geared for forward movement, a transmission lever, and connections therefrom operable while said car is geared for forward movement to render the braking means either operative or inoperative.

20. In an automobile, a transmission shaft, normally inoperative braking means thereon, a transmission lever, and connections therefrom operable to render the braking means operative by further movement of the transmission lever after it has been shifted into starting gear, thereby arresting backward movement of the car.

21. In a motor vehicle transmission, the combination of a driving shaft, a plurality of parallel shafts, one of which is axially aligned with said driving shaft, two different types of mechanisms operably associated with said shafts, one of said mechanisms being operable for providing a driving connection of a selected ratio between said aligned shafts, and the other of said mechanisms comprising a friction device operable in the same ratio, means shiftable in one direction and operable for rendering one of said mechanisms operative, said means being shiftable further in the same direction for rendering the other of said mechanisms operative, said friction device being disposed and arranged with respect to said one of said mechanisms so that said friction device can be rendered inoperative when said one of said mechanisms is operative.

22. In a motor vehicle transmission, a driving shaft, a rotatable element driven from said driving shaft, a pair of relatively movable shiftable elements, each of said shiftable elements being engageable with said rotatable element for effecting different functions in the same ratio, means for shifting said shiftable elements for successively engaging said shiftable elements with said rotatable element, and a driven shaft axially aligned with said driving shaft and directly connected to one of said shiftable elements.

23. In a motor vehicle transmission, a driving shaft, a plurality of parallel shafts, one of which is axially aligned with said driving shaft, a rotatable element on one of said parallel shafts, and driven from said driving shaft, a pair of shiftable elements, one of which is slidably splined on that one of said shafts which is aligned with said driving shaft, said shiftable elements being successively engageable with said rotatable element for effecting different functions in said transmission, means for simultaneously shifting said shiftable elements for engaging one of said shiftable elements with said rotatable element and for further shifting the other of said shiftable elements for engaging the same with said rotatable element, and a friction mechanism operatively associated with one of said shiftable elements and controlled thereby upon shifting thereof.

24. In a motor vehicle transmission, a driving shaft, a pair of toothed driving elements driven from said driving shaft, shiftable toothed means comprising a pair of members each cooperable with each of said driving elements for successively effecting different functions in said transmission, said means normally being disposed in a neutral position between said driving elements and being shiftable and overshiftable in both directions, and a shaft directly connected to one of said members to be driven thereby.

25. In a motor vehicle transmission, a driving shaft, a pair of driving elements driven from said driving shaft, shiftable means comprising a pair of elements each connectible with each of said driving elements and normally being disposed in a neutral position between said driving elements, said means being selectively shiftable in either direction to cooperate with either of said elements for effecting one function in the transmission and overshiftable in either direction for cooperating with either of said elements for effecting a different function in said transmission, and a shaft connected to a part of said means to be driven thereby.

26. In a motor vehicle transmission, a driving shaft, a plurality of parallel shafts, one of which is axially aligned with said driving shaft, a plurality of pairs of driving elements driven from said driving shaft, a pair of shiftable elements connected to one of said parallel shafts, one of said shiftable elements being shiftable to a greater extent than the other of said shiftable elements, each of said shiftable elements normally being disposed in neutral position between a pair of said driving elements and being shiftable in both directions for selectively engaging the driving elements of said pair, and a friction mechanism associated with each of the driving elements of only one pair of driving elements and operatively controlled by the shiftable element associated with said last-mentioned driving elements upon movement of said shiftable element.

27. In a motor vehicle transmission, a driving shaft, a plurality of parallel shafts, one of which is axially aligned with said driving shaft, a pair of shiftable elements connected to one of said parallel shafts, one of said shiftable elements being movable to a greater extent than the other of said shiftable elements, a first pair of driving elements adapted to be selectively engaged by one of said shiftable elements, two pair of devices including a second pair of driving elements and adapted to be operatively controlled by the other of said shiftable elements, said last-mentioned shiftable element normally being disposed in a neutral position between said second pair of driving elements and being selectively shiftable in either direction to render one of the devices of a selected pair of devices operable and further shiftable in the same direction to render the other of the devices of said selected pair of devices operable, said driving elements being adapted for driving said one of said parallel shafts at relatively different rates from said driving shaft.

28. In a motor vehicle, a transmission mechanism including a friction element, a positive driving element, a member operatively associated with one of said elements, shiftable means provided with teeth connectible with one of said elements through the teeth of said member to effect one function in said transmission, the teeth of said shiftable means being directly connectible with the other of said elements to provide a different function in said transmission, and a shaft, said shaft being coupled to said driving element through the intermediary of said shiftable means.

29. A vehicle transmission comprising, in combination, a driving shaft, a countershaft normally connected thereto, a driven shaft, means for selectively connecting the driven shaft to the countershaft for rotation in opposite directions and for alternatively directly connecting the driven shaft to the driving shaft and simultaneously disconnecting the countershaft from the driving and driven shafts, and automatic means for preventing reverse rotation of the countershaft even though the driven shaft is not connected to the countershaft to be rotated thereby.

30. A vehicle transmission comprising, in combination, a driving shaft, a countershaft normally connected thereto, a driven shaft, means for selectively connecting the driven shaft to the countershaft for rotation in opposite directions and for directly connecting the driven shaft to the driving shaft, and automatic means for preventing reverse rotation of both the driving shaft and the driven shaft, said automatic means being ineffective when the driving and driven shafts are directly coupled.

31. In combination in a change speed gear box of a motor vehicle, a drive shaft, a driven shaft, a third shaft cooperating with said drive shaft and driven shaft, a right hand and a left hand one-way clutch on said third shaft, one part of each clutch being stationary, and means selectively engageable with either the right hand or left hand one-way clutch and said driven shaft to automatically prevent retrograde movement of said vehicle either backwards or forwards.

32. In combination in a change speed gear box of a motor vehicle, a drive shaft, a driven shaft, a third shaft cooperating with said drive shaft and driven shaft, a right hand and a left hand one-way clutch on said third shaft, one part of each clutch being stationary, means selectively engageable with either the right hand or left hand one-way clutch and said driven shaft to automatically prevent retrograde movement of said vehicle either backwards or forwards, and a device for rendering said clutches inoperative.

33. In combination in a change speed gear box of a motor vehicle, a drive shaft, a driven shaft, a third shaft, a right hand and a left hand one-way clutch mounted on said third shaft, one part of each clutch being detachably connected to a fixed part of the vehicle, and means selectively engageable with either the right hand or left hand clutch and drivably connected with said driven shaft, to prevent retrograde movement of said vehicle either backward or forward.

34. A motor vehicle transmission mechanism having shift means whereby it may be set selectively for forward or reverse drive, a driven shaft, and means operable by overshift of said means to prevent movement of said shaft in a direction opposite to that for which said transmission is set.

35. The combination with a motor vehicle transmission mechanism including a drive shaft and shiftable rods operable to set said mechanism for rotating said shaft either forwardly or reversely, of brake mechanism operable in response to the movement of said rods for optionally preventing rotation of the drive shaft in a direction opposite to that for which said transmission is set, regardless whether it be set for forward or reverse.

36. The combination with a motor vehicle transmission mechanism including a drive member and shifting rods operable to set said mechanism for rotating said member either forwardly or reversely, of brake mechanism operable in response to the movement of said rods for optionally preventing movement of said member in a direction opposite to that for which said mechanism is set regardless whether it be set for forward or reverse, and permitting rotation of the member in both directions.

37. The combination with a motor vehicle transmission mechanism including a drive member and shifting means operable to set said mechanism for rotating said member either forwardly or reversely, of brake mechanism operable in response to the movement of said means for optionally preventing movement of said member in a direction opposite to that for which said mechanism is set regardless whether it be set for forward or reverse.

38. A motor vehicle transmission comprising, in combination, a driven member, selectively operable change speed devices for driving said member, a member movable in one direction to operate at least one of said devices, and means rendered operative by further movement of said movable member in the same direction to prevent rotation of the driven member in one direction.

39. A motor vehicle transmission comprising, in combination, a driven member, selectively operable devices for driving said member in opposite directions, a member movable in one direction to control at least one of said devices, and means rendered operative by further movement of said movable member in the same direction to prevent rotation of the driven member in one direction.

40. A motor vehicle transmission comprising a plurality of mechanisms, including change speed gearing, shift means for setting said gearing in operation, said shift means being overshiftable to control the operation of another of said mechanisms without changing said change speed gearing.

41. In a motor vehicle, the combination of a shaft, two different types of mechanisms operatively associated with said shaft, one of said mechanisms comprising a friction device, said mechanisms being selectively cooperable with said shaft to effect different functions in the operation of said vehicle, shift means for setting one of said mechanisms in operation, said shift means being overshiftable to control the operation of the other of said mechanisms, said friction device comprising a plurality of members disposed and arranged so that the grip of said friction device is increased due to the tendency of one of said members to rotate relative to another of said members.

42. In a motor vehicle transmission, a shaft, two different types of mechanisms including change speed gearing and a friction device operably associated with said shaft, shift means for setting said gearing in operation, said shift means being overshiftable to control the operation of the other of said mechanisms.

43. In a motor vehicle, the combination of a shaft operatively associated with the road wheels of said vehicle, two different types of mechanisms operatively associated with said shaft, one of said mechanisms comprising a friction device, said friction device comprising a plurality of members disposed and arranged so that the grip of said friction device is increased by the tendency of one of said members to rotate relative to another of said members, said mechanisms having different functions, shift means for setting one of said mechanisms in operation, said shift means being overshiftable to control the operation of the other of said mechanisms without eliminating the function of said friction device.

44. In a motor vehicle drive system, a transmission including a shaft operatively associated with the road wheels of the vehicle, and a mechanism normally operable for automatically holding said vehicle against undesired reverse movement, said mechanism comprising a friction device including a part fixed to a stationary part of said vehicle, a cooperating friction part non-rotatably connected to said shaft, and a one-way clutch including a member fixed to rotate with said shaft, and another member adapted to be coupled with said member upon undesired reverse movement of said vehicle, and a movable member operatively associated with said one-way clutch for rendering said mechanism operative and inoperative.

45. In a motor vehicle transmission, a driving shaft, a rotatable element driven from said driving shaft and having radially extending projections, a pair of relatively movable shiftable elements each of said shiftable elements being provided with radially extending projections and being engageable with said rotatable element for effecting different functions in said transmission, one of said shiftable elements comprising a part of a friction mechanism, the radially extending projections of one of said elements being adapted to bridge the projections of the other two of said elements for effecting one of said functions, means for shifting said shiftable elements for successively engaging said shiftable elements with said rotatable element, and a driven shaft axially aligned with said driving shaft and directly connected to one of said shiftable elements.

46. In a motor vehicle transmission, a driving shaft, a rotatable element driven from said driving shaft and having radially extending projections, a pair of relatively movable shiftable elements, each of said shiftable elements being provided with radially extending projections and being engageable with said rotatable element for effecting different functions in the transmission, a driven shaft axially aligned with said driving shaft and directly connected to one of said shiftable elements, means for shifting one of said shiftable elements for engaging the same with said rotatable element for effecting one of said functions, said means being shiftable further in the same direction for shifting the other of said shiftable elements into engagement with said rotatable element so that the projections of one of said elements will bridge the projections of the other two of said elements for effecting the other of said functions.

47. In a motor vehicle transmission, the combination of a driving shaft, a rotatable element driven from said driving shaft and having radially extending projections, a pair of relatively movable shiftable elements, each of said shiftable elements being provided with radially extending projections and being engageable with said rotatable element for effecting different functions in the transmission, the radially extending projections of one of said elements being adapted to bridge the projections of the other two of said elements for effecting one of said functions, means for shifting said shiftable elements for successively engaging the same with said rotatable element, and a driven shaft axially aligned with said driving shaft and directly connected to one of said shiftable elements.

48. In a motor vehicle transmission, the combination of a driving shaft, a rotatable element driven from said driving shaft and having radially extending projections, a pair of relatively movable shiftable elements, each of said shiftable elements being provided with radially extending projections and being engageable with said rotatable element for effecting different functions in the transmission, the radially extending projections of one of said elements being adapted to bridge the projections of the other two of said elements for effecting one of said functions at substantially the pitch circle of said elements, means for shifting said shiftable elements for successively engaging the same with said rotatable element, and a driven shaft axially aligned with said driving shaft and directly connected to one of said shiftable elements.

49. A motor vehicle transmission comprising a driving shaft, a driven shaft axially aligned with said driving shaft and operatively associated with the road wheels of the vehicle, a mechanism comprising a train of gearing operable for driving said driven shaft in a selected gear ratio in the same direction of rotation as the direction of rotation of said driving shaft, a friction mechanism operatively associated with said train of gearing, shift means operable upon shifting thereof for controlling the operation of one of said mechanisms, said shift means being shiftable further in the same direction for controlling the operation of the other of said mechanisms in the same gear ratio, said friction mechanism being disposed and arranged with respect to said first mentioned mechanism so that said friction mechanism can be rendered inoperative when said first named mechanism is operative.

50. In a motor vehicle transmission, a driving shaft, a driven shaft operatively associated with the road wheels of the vehicle and adapted to be driven from said driving shaft, a plurality of mechanisms operatively associated with said driven shaft, one of said mechanisms comprising a friction device, said friction device comprising a plurality of members disposed and arranged so that the grip of said friction device is increased due to the tendency of one of said members to rotate relative to another of said members, said mechanisms being cooperable with said driven shaft to effect different functions in the transmission, one of said functions being the provision of a driving connection between said driving and driven shafts for driving said driven shaft in the same direction of rotation as the direction of rotation of said driving shaft, shift means operable upon shifting thereof for controlling the operation of one of said mechanisms, said shift means being shiftable further in the same direction for controlling the operation of the other of said mechanisms.

51. In a motor vehicle transmission, the combination of a driving shaft, a plurality of parallel shafts, one of which is axially aligned with said driving shaft, a plurality of mechanisms operatively associated with said shafts, said shafts being rotatable in at least one direction when both of said mechanisms are in operation, one of said mechanisms being operable for providing a driving connection of a selected ratio between said aligned shafts and the other of said mechanisms comprising a friction device operable in the same ratio, means shiftable in one direction and operable for rendering one of said mechanisms operative, said means being shiftable further in the same direction for rendering another of said mechanisms operative, said friction device comprising a plurality of members disposed and arranged so that the grip of said friction device is increased by the tendency of one of said members to rotate relative to another of said members.

CARL F. RAUEN.